(12) United States Patent
Hosoe

(10) Patent No.: US 7,293,337 B2
(45) Date of Patent: Nov. 13, 2007

(54) MACHINING APPARATUS

(75) Inventor: Shigeru Hosoe, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/519,561

(22) Filed: Sep. 12, 2006

(65) Prior Publication Data

US 2007/0006436 A1   Jan. 11, 2007

Related U.S. Application Data

(62) Division of application No. 10/827,579, filed on Apr. 19, 2004, now abandoned.

(30) Foreign Application Priority Data

Aug. 12, 2003 (JP) .............................. 2003-292289
Sep. 17, 2003 (JP) .............................. 2003-324674

(51) Int. Cl.
*B23P 23/00* (2006.01)
*B23C 1/14* (2006.01)
*B23C 1/27* (2006.01)

(52) U.S. Cl. .................... 29/28; 29/27 C; 409/141; 409/165; 409/235; 451/242

(58) Field of Classification Search .................... 29/28, 29/27 C; 409/141, 165, 235; 451/242
See application file for complete search history.

(56) References Cited

U.S. PATENT DOCUMENTS 3,460,435 A * 8/1969 Hucks et al. ................ 409/183
3,825,245 A * 7/1974 Osburn et al. ............... 29/33 P
4,090,287 A * 5/1978 Selander ....................... 29/563
4,984,351 A   1/1991 Matsuyama et al.
5,348,431 A   9/1994 Kusunoki et al.
5,402,607 A   4/1995 Lombard
5,624,363 A * 4/1997 Kuriki ........................... 483/3
5,997,382 A  12/1999 Sasamori et al.
6,050,880 A * 4/2000 Kato et al. ..................... 451/41
6,174,115 B1  1/2001 Hashidate et al.
6,206,764 B1  3/2001 Hsu et al.
6,283,195 B1 * 9/2001 Chandley et al. ............. 72/462
6,583,859 B2  6/2003 Miyajima et al.
2002/0085893 A1 7/2002 Geiger et al.
2002/0126421 A1 9/2002 Takahashi et al.

FOREIGN PATENT DOCUMENTS

JP          10076170 A  * 3/1998
JP          2003-039294    2/2003

* cited by examiner

*Primary Examiner*—Dana Ross
(74) *Attorney, Agent, or Firm*—Cohen Pontani Lieberman & Pavane LLP

(57) ABSTRACT

A machining apparatus for conducting at least one of a cutting process and a grinding process, comprises a stationary base; and a working device mounted on the stationary base and having a degree of freedom of more than two axes to conduct at least one of a cutting process and a grinding process, the working device comprising a first working bench which is formed of a ceramic material and is movable linearly with a degree of freedom of not less than one axes or more while holding a work piece or a tool.

7 Claims, 3 Drawing Sheets

MACHINING APPARATUS

CROSS-REFERENCE TO RELATED APPLICATIONS

This is a division of application Ser. No. 10/827,579, filed Apr. 19, 2004, now abandoned which claims priority from Japanese Patent Application No. 2003-292289, filed Aug. 12, 2003 and Japanese Patent Application No. 2003-324674, filed Sep. 17, 2003. The entire content of application Ser. No. 10/827,579 is incorporated herewith by reference.

BACKGROUND OF THE INVENTION

1. Field of the Invention

This invention relates to a machining apparatus having a degree of freedom of machining of three axes or greater.

Herein, the term "axes" or "an axis" is defined as a portion of a machining apparatus that functions as the reference line or plane of a movement for machining, for example, the rotary shaft of a swivel table, the slideway of a slide table, etc. The degree of freedom of movement for machining is one for each of the "axes".

2. Description of the Related Art

A machining apparatus for applying cutting machining, grinding machining, or the like to an optical element and a die for the formation thereof is known (refer to JP 2003-39294, for example).

In this connection, in order to generate a complex curved surface corresponding to an aspherical surface of an optical element with a high accuracy, a degree of freedom of machining of two or less is insufficient, and a degree of freedom of machining of three or greater is required. However, in a machining apparatus having a degree of freedom of machining of three axes or greater for the generating of an optical surface which is a free surface, whichever of cutting or grinding the machining may be, it becomes necessary, a shaping process in which a machined surface is generated while a number of through machining steps are being connected one after another; therefore, it has a feature such that it requires a very long time, which is not found in the machining by means of any other kind of machining apparatus. For that reason, in order to carry out a machining for generating a free surface with a high accuracy and a high efficiency, it is necessary to actualize the following necessary conditions more sufficiently than a conventional machining apparatus.

Necessary Conditions for Actualizing High Accuracy (1) There is a requirement for making higher the control accuracy of the machine, and for that purpose, it is necessary to control a workbench (a slide table or a swivel table) driven by a high-speed servomechanism with a high accuracy achieved by the improvement of the resolving power of the position measurement of each of the axes, or to lighten the driven workbench by the use of a material having a small specific weight so that it may comply with the drive instruction of the servomotor at a high speed.

(2) Because the machine has a block structure with each of the axis portions placed over one another in two or three stages, which makes the overall stiffness tend to become lowered for the structural reason, it is necessary to make higher the stiffness of each of the axis portions as much as possible, and for that purpose, it becomes important to lower the viscosity of the pressure transmission medium of the static-pressure slide, or to use a material having a high Young's modulus.

(3) It is also very important to make the machine not subject to the temperature variation of the environment, and in a case where a static-pressure slide is used, it is important to lower the viscosity of the pressure transmission medium in order to suppress a useless heat generation at the static-pressure surface, and also it is important to select a material having a small coefficient of linear expansion for each of the members.

(4) It is necessary to shorten the machining time for the purpose of making it possible to finish the machining before the environment variation becomes large and carrying out the machining with a high efficiency; therefore, the following things are necessary: to comply with the high resolution of the position measurement by making higher the speed of the servomechanism in order to drive the axis at a high speed, and to lower the viscosity of the pressure transmission medium so that the lowering of stiffness of the static-pressure surface and a vibration may not be generated.

(5) In order to prevent the influence of the vibration due to the vibration of the floor and the oscillation of the machine body itself, it is necessary, an active vibration-reducing table or the like which practices a control in such a way that it detects and suppresses a vibration in an active manner.

However, heretofore, it has never existed a machining apparatus having a degree of freedom of machining of three axes or greater that can achieve the compatibility of a high accuracy of an order of sub-micron with a high efficiency of machining.

SUMMARY OF THE INVENTION

This invention has been made in view of the above-mentioned points of problem in conventional technologies, and it is an object of this invention to provide a machining apparatus having a degree of freedom of machining of three axes or greater which is capable of achieving the compatibility of a high accuracy with a high efficiency of machining.

A first embodiment of the present invention is a machining apparatus for practicing a cutting machining or a grinding machining with a degree of freedom of three axes or greater, wherein a first workbench holding a work piece or a tool and being linearly movable with a degree of freedom of at least one or greater is formed of a ceramic material.

In a high-accuracy machining apparatus having a measurement resolution of 10 nm or less for the axis position based on a conventional technology, the material of the workbench to be driven has been carbon steel such as cast iron or S45C in most cases, and its specific weight is about 7.8 g/cm$^3$. Therefore, because the workbench becomes heavy, and the power of a servomotor required for driving this becomes high, there has been a problem that the quantity of heat generation from this motor becomes large. Further, because it has not been possible to move the workbench at a high speed, there has been also a problem that the speed of machining becomes slow, which makes the machining time longer, and if a variation of the environment such as the temperature occurs, the deformation of the workbench due to thermal expansion and the drift of position of a work piece and a tool become large, which makes a high-accuracy machining difficult.

Further, in a machining apparatus having a degree of freedom of machining of three axes or greater, it is carried out in most cases, a shaping machining, that is, a machining in which, in association with a reciprocating movement with respect to one axis, another movement with respect to another axis is carried out, which moves a tool along the cross-sectional shape of a free surface, and by the three-dimensional accumulation of a number of movements of the tool one above another, a curved surface is generated by cutting, grinding, etc.; however, this shaping machining takes a very long time, particularly, in generating a high-accuracy optical surface, even for a work piece of a size of an order of several centimeters, it is general that a machining time of several ten hours is required for it. Accordingly, it is very important for the purpose of carrying out a high-accuracy generating of an optical surface, how to make the machining difficult to undergo the influence of the change of the environment such as the temperature during the period of time of machining, or to make the variation of the environment during the machining smaller by shortening the machining time.

In contrast with this, according to this invention, even in a case where a temperature variation occurs, because the thermal expansion coefficient can be suppressed at a low value in comparison with a steel or the like, by forming the above-mentioned first machining table of a ceramic material, the accuracy of machining can be maintained, while the machining time can be shortened because the acceleration and deceleration ability is raised by the workbench being made light-weighted. Further, because it is enough if the power of the motor or the like as an axis member driving means for driving the above-mentioned first workbench is low, energy saving can be achieved and also the heat generation can be suppressed; therefore, a higher-accuracy machining can be actualized.

Further, in a machining apparatus having a degree of freedom of machining of three axes or more, it is essential to take a structure such that a workbench of one axis is placed on a workbench of another axis because the number of axes are large, and usually, a multi-axis structure is made up of two or three stage workbenches being piled. This means, in other words, that the stiffness of each axis member is accumulated to come to support a tool or a work finally; therefore, it indicates that, in comparison with a usual machining apparatus having two axes or less, its axis stiffness has to be made two or three times higher. On top of it, for a tool or a work piece in order to avoid the interference between the movements with respect to their respective axes, it is necessary for a tool or a work piece to be fixed at a place deviated remarkably from the slideway of each of the axis members in an overhanging manner; therefore, because the machining force acts on the slideway as a moment of force during machining, and further, the machining is to be carried out in a condition that the stiffness is made weaker, it is necessary to make the stiffness of each of the axis members as high as possible in the case of a high-accuracy machining of three axes or more.

In contrast with this, according to this invention, by forming the above-mentioned first workbench of a ceramic material, in comparison, for example, with a conventional workbench made of cast iron, its weight can be reduced by a large margin and its Young's modulus can be made two times larger; therefore, bending caused by the self-weight can be suppressed, and it is obtained a structure such that a resonance or the like is hard to produce because the specific frequency of the vibration is made higher.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
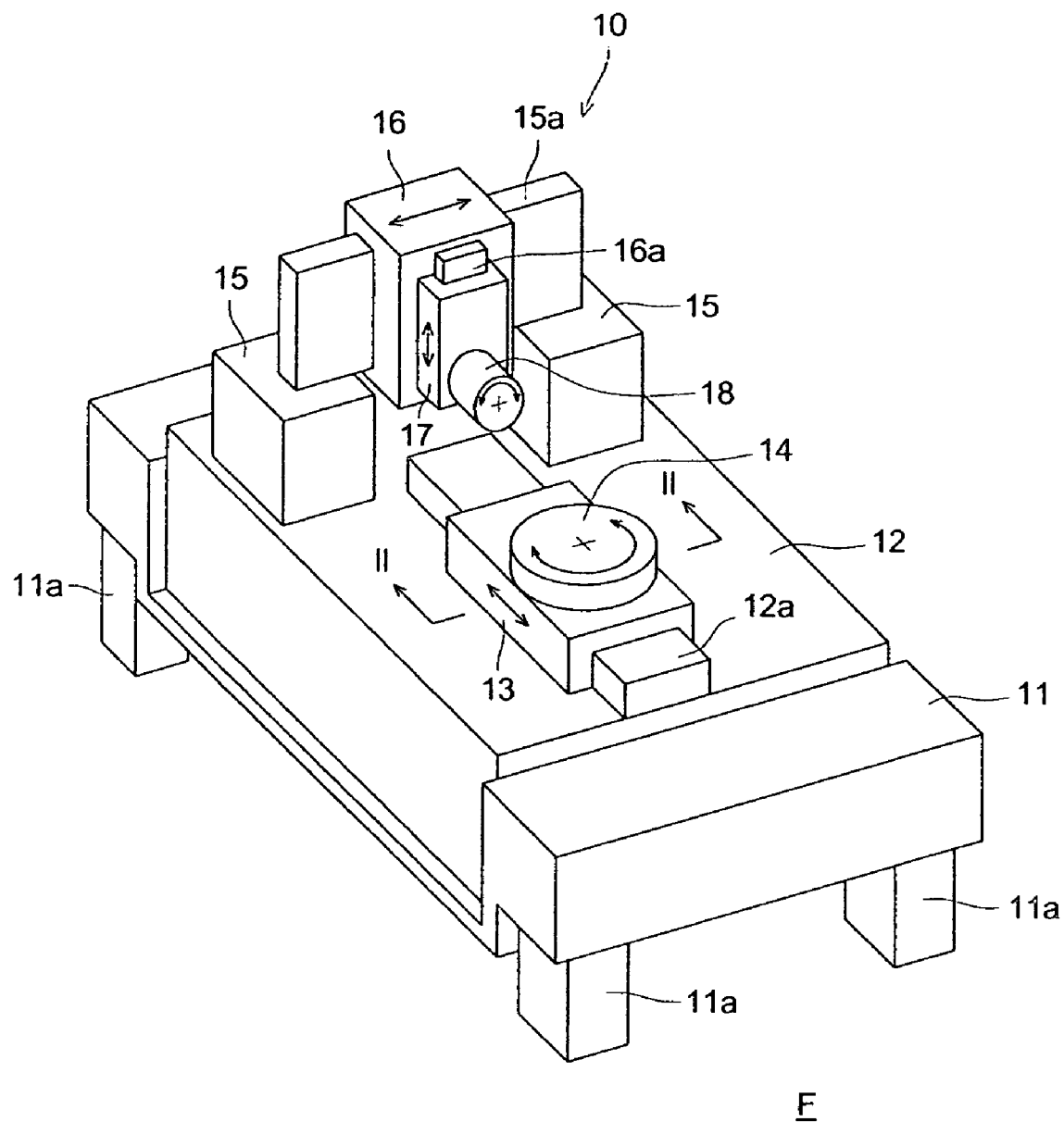
FIG. 1 is a perspective view of a five-axis machining apparatus 10 of this invention.

Firstly, the preferable structures according to the present invention are explained.

A second embodiment of the invention is a variant of the first embodiment, wherein the aforesaid ceramic material has a coefficient of linear expansion of $5 \times 10^{-6}$ K$^{-1}$ or less; therefore, as compared to cast iron, its thermal expansion can be suppressed to be low by half or less; therefore, the accuracy of machining can be maintained secured while the acceleration ability is made higher owing to its weight being made lighter, which makes it possible to shorten the machining time.

A third embodiment of the invention is a variant of the first or the second embodiment, wherein the aforesaid ceramic material contains silicon nitride of 50% or more by weight and has a specific weight of 4 g/cm$^3$; therefore, the weight of the aforesaid workbench becomes a half or less of a conventional one, and even if the power of the axis member driving means for driving it (for example, a motor) is the same, the acceleration can be made two times theoretically. Accordingly, the time to reach the target machining speed is reduced by half, and the quantity of heat generation is also halved for that reason. Further, because it becomes fast the response of the servomechanism for detecting the position of the aforesaid first workbench and applying a feedback to the driving motor, the accuracy of movement and the accuracy of positioning of said first workbench are made higher. From this viewpoint, the specific weight may be better if it is smaller; however, because a high Young's modulus is also necessary at the same time for the purpose of raising the stiffness, the material should be selected with it taken into consideration.

A fourth embodiment of the invention is a variant of one of the first second and third embodiments, wherein the aforesaid ceramic material has a Young's modulus of 200 GPa or greater; therefore, as compared to cast iron, Young's modulus can be made greater by 30% or more, and for this reason, it is possible to improve the stiffness of the aforesaid first workbench.

The main part of the material of a conventional machining apparatus is cast iron, and its Young's modulus is as low as an order of 150 GPa; therefore, if a combination of axis members having a degree of freedom of three or greater totally is to be used, it is impossible to achieve a high-accuracy machining. Further, the coefficient of linear expansion is too high as $10 \times 10^{-6}$ K$^{-1}$, and in a condition that the environmental temperature varies during a machining of a long period of time, thermal expansion or contraction is generated to make the machining point drift. As shown in Table 1, in materials to be considered as a material for machine structure each, Young's moduli and coefficients of linear expansion are collected; ceramic materials such as silicon nitride, sialon, and silicon carbide become a candidate for the material to be used in a machining apparatus. Among these ceramic materials, sialon is a mix material composed mainly of silicon nitride with alumina etc. contained, and the basic property is similar to silicon nitride as its main component. Accordingly, both the materials have a high breakage toughness each as a ceramic material, and have an advantage that they cannot be broken easily. Therefore, in particular, a ceramic material composed mainly of silicon nitride satisfies the condition of having a specific weight of 4 g/cm$^3$ or less, a coefficient of linear expansion of $5\times10^{-5}$ K$^{-1}$ or less, and a Young's modulus of 200 GPa or greater, and at the same time, it is conspicuous in that it has a high breakage toughness and is hard to break; by using this material in a machining apparatus of a degree of freedom of machining of three axes or greater, it is possible to stably practice an extremely high-accuracy machining.

become a source of vibration because the screw is supported by a static pressure of oil against its nut thread, but the viscosity of the oil is made high in order to keep the stiffness in the feed direction high, which makes a large torque necessary for the rotation of the screw at a high speed; thus, there are a problem of heat generation, a problem that the power of driving motor has to be made high, etc. From these viewpoints, it can be said that it is desirable to use a linear motor which can actualize a high acceleration and a non-contact feeding. On top of it, in a machining apparatus of this structure, because the above-mentioned first workbench to be driven is made of a ceramic material, which is a non-conductive and non-magnetic material, the leakage magnetic flux due to the linear motor being placed to the above-mentioned first workbench and the slide is very weak, which is different from the case of a conventional metallic material such as cast iron, and also an eddy current and an electric motive force due to the movement of the above-mentioned first workbench are not generated; therefore, the first workbench is very suitable for the use of such a linear motor for the reason that a high-accuracy and high-speed feeding with a small amount of noise can be actualized.

TABLE 1

|  | Cast iron | Granite | Invar | Nobinite CS-5 | Al$_2$O$_3$ | Si$_3$N$_4$ | Sialon | Silicon carbide |
| --- | --- | --- | --- | --- | --- | --- | --- | --- |
| Specific weight (g/cm$^3$) | 7.3 | 26 | 8.1 | 7.5 | 3.9 | 3.3 | 3.3 | 3.1 |
| Hardness (Hv) | 200 | 500 | 190 | 160 | 1800 | 1400 | 1580 | 2200 |
| Breakage toughness (MN/m$^{3/2}$) | — | — | — | — | 4.0 | 6.0 | 6.0 | 3.5 |
| Young's modulus (GPa) | 150 | 70 | 130 | 130 | 382 | 284 | 294 | 412 |
| Coefficient of linear expansion ($\times 10^{-6}$ K$^{-1}$) | 11 | 7.0 | 1.5 | 2 | 7.2 | 2.7 | 3.0 | 4.0 |
| Thermal conductivity (W/mK) | 41 | 18 | 11 | 13 | 29 | 13 | 21 | 83 |

A fifth embodiment of the invention is a variant of one of the first to fourth embodiments, wherein the aforesaid first workbench is driven along a static-pressure slide by an axis member driving means with a frequency of 50 Hz (desirably 100 Hz) or higher of a servo gain becoming −3 dB. In particular, even in a case where the moving velocity of the aforesaid first workbench is made higher in order to raise the efficiency of machining, because the weight of said first workbench is made light-weighted, the compliance of said first workbench can be maintained, even though the above-mentioned axis member driving means is subject to a control of such a high response characteristic; therefore, it is possible to make the improvement of the efficiency of machining compatible with the high accuracy of the machining.

A sixth embodiment of the invention is a variant of the fifth embodiment, wherein the aforesaid axis member driving means is a linear motor. In a linear driving of a general machining apparatus, a ball screw, a static pressure screw, or the like is also used, and in particular, in a machining apparatus for carrying out cutting machining or a grinding machining with a degree of freedom of three axes or greater like this invention, it is desirable to drive the axis members at a high speed for the purpose of shortening the time of machining and achieving a high accuracy. However, as regards a ball screw, a nut is supported through a number of balls by a screw, and owing to it, feeding of the axis member is carried out through the rolling of balls in contact with the screw; therefore, the higher the speed becomes, the stronger vibration is generated, which makes it difficult to carry out a high-accuracy machining. Further, as regards a static-pressure screw, although it is advantageous in that it does not A seventh embodiment of the invention is a variant of one of the first to sixth embodiments further comprising a measurement means having a resolution of 10 nm or less for measuring the position of the aforesaid first workbench; therefore, the response of the servomechanism which detects the position of the above-mentioned first workbench to give a feedback to the axis member driving means is made faster, which makes higher the accuracy of movement and the accuracy of positioning of the above-mentioned first workbench.

An eighth embodiment of the invention is a variant of one of the first to seventh embodiments, wherein the machining speed of a work piece or a tool held by the aforesaid first workbench is 600 mm/min or higher.

In a generating machining by means of a machining apparatus of a degree of freedom of three axes or greater, as described before, because shaping machining for generating a free curved surface through the accumulation of a cross-sectional shape formed by a reciprocating movement is mostly used, the machining time tends to become long. For that reason, it can be said that it is important to make the machining time shorter by making the machining speed higher, in order that not only the efficiency of machining may be improved but also a high-accuracy machining may be actualized by the reduction of temperature variation during the machining.

In the above description, it is the frequency characteristic of the measuring sensor such as a laser scale for carrying out the measurement of the position of the axis member mainly that determines the upper limit of the machining speed. The higher the accuracy of measurement of a sensor to be used is made, the higher the accuracy of the position signal to be outputted becomes; however, because a number of displacement signals are outputted even by minute displacements of an axis member owing to it, its output frequency reaches several MHz easily in a case where an axis member is moved at a high speed. For that reason, the frequency exceeds the allowed frequency range of the analog amplification circuit in the measuring sensor and the wiring to the servo-driver, and the action of the axis member cannot comply with it, which produces an error.

Assuming that the signals are outputted by 1 nm unit in order to make high the accuracy of the detection resolution of the measuring sensor, the frequency becomes 10 MHz at the axis member speed 600 mm/min. A frequency of this order is, in the present situation, the maximum frequency value of a signal to be outputted by a measuring sensor with the accuracy maintained. Accordingly, in order to practice a machining at a high accuracy with a high efficiency in a short time, it is desirable to practice a machining at this highest speed possible in the present situation, and from now on, if the frequency range of the measuring sensor is improved, it is desirable to raise the speed of machining corresponding to the amount of improvement. Accordingly, as this structure, it is most desirable from the viewpoint of the efficiency and accuracy of machining to make the speed of machining 600 mm/min or higher with an expectation of some improvement from now on included.

Further, in order to control axis members with a high accuracy in compatibility with a high-speed driving, it is necessary that the servo-control capability can also respond to this frequency range of the measuring sensor sufficiently, however, there is an actual situation that the frequency range of the servo-loop is usually of an order of 50 Hz to 100 Hz, or of an order of 200 Hz at the highest, which is remarkably low compared to the frequency range of the measuring sensor described above. Because an electrical circuit for carrying out this servo-control has usually a frequency range close to several hundred kHz, it is understood that the response speed of this portion hardly influences the frequency range of the servo-loop. That is, it is mostly the mechanical response that determines the frequency range of the servo-loop, and the response depends mostly on the delay of time required for moving the above-mentioned first workbench or a second workbench from the time an instruction signal is converted into a driving force by the driving motor which is transmitted to the workbench. Accordingly, it can be understood how much it is effective for actualizing a high-accuracy machining in compatibility with a high-speed performance that, as this structure, the mass of the above-mentioned first workbench is lowered, which makes the force of inertia and the moment of inertia weakened, and the mechanical response is improved.

A ninth embodiment of the invention is a variant of the eighth embodiment, wherein the aforesaid first workbench is driven at the highest speed in said machining apparatus; therefore, it is possible to exhibit the above-mentioned effect more.

A tenth embodiment of the invention is a machining apparatus which practices a cutting machining or a grinding machining with a degree of freedom of three axes or greater, wherein a second workbench which holds a work piece or a tool and is capable of swiveling with a degree of freedom of at least one axis or greater is made of a ceramic material.

The material for making up a conventional swiveling workbench is cast iron or steel in most cases. For that reason, the swiveling workbench becomes heavy, and the power of a servomotor required for driving this becomes high, which results in a large quantity of heat generation from the axis member driving means (for example, a motor). Further, because it is not possible to move the swiveling workbench at a high speed, the machining speed becomes slow, and the machining time becomes longer, which makes the variation of the environment such as the temperature larger; therefore, the deformation of the workbench due to thermal expansion and the drift of position of a tool and a work piece become large, which makes a high-accuracy machining difficult.

In contrast with this, by this structure, because it is possible to suppress thermal expansion to be lower as compared to steel by forming the aforesaid second workbench of a ceramic material, even in a case where a temperature variation occurs, the accuracy of machining can be maintained and also the acceleration/deceleration performance is made higher by the workbench being made lightweighted, which makes it possible to shorten the machining time. Further, because it is enough even if the capacity of a motor or the like as a driving means for driving the above-mentioned second workbench is small, energy saving can be achieved, and at the same time, the quantity of heat generation can be suppressed; therefore, a higher-accuracy machining can be actualized.

An eleventh embodiment of the invention is a variant of the tenth embodiment, wherein the aforesaid ceramic material has a coefficient of linear expansion of $5 \times 10^{-6}$ $K^{-1}$ or less. The effect of this structure is the same as the structure set forth in the second embodiment.

A twelfth embodiment of the invention is a variant of the tenth or the eleventh embodiment, wherein the aforesaid ceramic material contains silicon nitride of 50% or more by weight and has a specific weight of 4 $g/cm^3$. The effect of this structure is the same as the structure set forth in the third embodiment.

A thirteenth embodiment of the invention is a variant of one of the tenth, eleventh and twelfth embodiments, wherein the aforesaid ceramic material has a Young's modulus of 200 GPa or greater. The effect of this structure is the same as the structure set forth in the fourth embodiment.

A fourteenth embodiment of the invention is a variant of one of the tenth to thirteenth embodiments, wherein the aforesaid second workbench is driven along a static-pressure slide by an axis member driving means with a frequency of 50 Hz (desirably 100 Hz) or higher of a servo gain becoming −3 dB. The effect of this structure is the same as the structure set forth in the fifth embodiment.

A fifteenth embodiment of the invention is a variant of the fourteenth embodiment, wherein the aforesaid axis member driving means is an AC servomotor. As regards the second workbench capable of swiveling, its driving for swiveling is carried out by a DC servomotor or a method such that the resolution of the rotation angle is increased by a gear provided in between; however, because there is a brush in a DC servomotor, owing to the variation of its frictional force and contact resistance, it is difficult to stably maintain a high-accuracy swivel angle. In a case where a speed reducing gear such as a worm gear or a harmonic gear is used, it seems that the angular resolution is improved by an amount corresponding to the magnification of the speed reduction ratio apparently, but actually, a stick-slip phenomenon occurs due to the static frictional force of the gear, or a backlash is generated by the poor meshing of the gears with one another, which makes a control of a minute rotational angle difficult on the contrary. Further, these methods in which an external motor is mounted to a swivel shaft produce necessarily an eccentricity in the coupling of the motor shaft and the rotary shaft, which makes the controlled rotational angle and the actual rotational angle not agree with one another in a strict sense, and the torque stiffness is lowered by a flexible coupling member which is used for the coupling between both the shafts in order to ease the twist due to the eccentricity and the unevenness of torque, which lowers the frequency range of the feedback control to degrade the servo-control characteristic; therefore, it does not always agree with the purpose of this structure for actualizing a high-accuracy machining.

In that point, a direct AC servomotor having a permanent magnet fitted directly at the swivel shaft is not provided with a frictional member such as a brush, and is capable of generating a torque directly in the rotary shaft in a non-contact manner, which raises its stiffness also; therefore, if it is used in a machining apparatus having a degree of freedom of three axes or greater as this structure, it is desirable for the practice of a high-accuracy machining. On the other hand, heat is generated in the portion of the coil built in an AC servomotor; however, if the swiveling second workbench is made of a ceramic material as this structure, the temperature drift of the position of a tool or a work piece on the second workbench is small, and heat is hard to transfer to the first workbench which carries this second workbench thereon, which makes it difficult to bring about a thermal expansion or contraction, because the ceramic material such as silicon nitride or sialon has a very low thermal conductivity; this is very advantageous. That is, a problem in using an AC servomotor is solved successfully by this structure; therefore, it can be said that it is appropriate to use an AC servomotor for the driving of the swiveling second workbench.

A sixteenth embodiment of the invention is a variant of one of the tenth to fifteenth embodiments further comprising a measuring means having a resolution of a 1 angular second or less for measuring the angle of the aforesaid second workbench. The effect of this structure is the same as the structure set forth in the seventh embodiment.

A seventeenth embodiment of the invention is a variant of one of the tenth to sixteenth embodiments, wherein the rotational machining speed of a work piece or a tool held by the aforesaid second workbench is 1°/sec or higher. The effect of this structure is the same as the structure set forth in the eighth embodiment.

An eighteenth embodiment of the invention is a variant of the seventeenth embodiment, wherein the aforesaid second workbench is driven at the highest speed in said machining apparatus. The effect of this structure is the same as the structure set forth in the ninth embodiment.

A nineteenth embodiment of the invention is a variant of one of the tenth to eighteenth embodiments, wherein a support table for supporting the aforesaid second workbench is formed of at least one of a ceramic material satisfying at least one of the conditions of having a coefficient of linear expansion of $5\times10^{-6}$ $K^{-1}$ or less, containing silicon nitride of 50% by weight and having a specific weight of 4 g/cm$^3$ or less, and having a Young's modulus of 200 GPa or greater, and an alloy containing nickel from 10% by weight to 50% by weight. In particular, in the case where the aforesaid second workbench is carried on the aforesaid first workbench, it is desirable that said support table is formed of an alloy containing nickel from 10% by weight to 50% by weight (for example, invar, incolloy 904, or the like).

A twentieth embodiment of the invention is a variant of one of the fifth to ninth and fourteenth to nineteenth embodiments, wherein at least one of the aforesaid static-pressure slide and the base for fixing it is formed of a ceramic material satisfying at least one of the conditions of having a coefficient of linear expansion of $5\times10^{-6}$ $K^{-1}$ or less, containing silicon nitride of 50% by weight and having a specific weight of 4 g/cm$^3$ or less, and having a Young's modulus of 200 GPa or greater.

The shaping machining by means of a machining apparatus of a degree of freedom of machining of three axes or greater requires a very long time, and on top of it, because the axis members are placed in two or three stages one over another, actually, there is a problem that the overhang of mounting of a tool or a work piece becomes large through the objects lying between the base and the point of machining such as the tool rest and the workbench, and in a case where the workbench and the static-pressure slide is thermally expanded or contracted by a temperature variation, the relative position between a tool and a work piece is not only shifted simply in one direction, but it exhibits also a simultaneous generation of an oscillation like a moment. Further, because the temperature cannot be made uniform from the bottom to the top of the work benches piled up high, in each of the axis members piled up, the workbench is subjected to a thermal expansion or contraction, and in response to it, the final machining point of the tool and the position of work piece are displaced in a complex manner. Therefore, it is almost impossible to correct this machining displacement (drift) due to the temperature variation, and it can be said that, in order to prevent this, first, the thermal expansion/contraction itself should thoroughly be made small.

However, if the workbenches and the static slides are made of cast iron or steel as a conventional machining apparatus, it is extremely difficult to prevent such an influence of thermal expansion or contraction; therefore, in order to maintain a high temperature stability, it is desirable to make the coefficient of linear expansion of the material of the first and second workbenches and the static-pressure slides $5\times10^{-6}$ $K^{-1}$ or less. As understood from Table 1, this numerical value is equivalent to a half of the coefficient of linear expansion of cast iron or steel, and by this condition, thermal expansion is halved in each of the horizontal direction and the vertical direction; therefore, the three-dimensional variation range of the machining point is reduced to ⅛, and a large effect can be obtained in the stability against a temperature variation.

Further, as another large factor of the drift of the machining point, there is an expansion or contraction of the bases for fixing their respective axis members. Because the bases are large-sized, their heat capacities are also large; owing to it, if a temperature difference is produced locally, no equilibrium is established, and heat is continue to be transferred slowly for an indefinite time, which keeps the local temperature difference left as produced. From such a characteristic, if the temperature of a portion of the base is changed by machining, a phenomenon that the portion is thermally expanded or contracted to produce a variation, which does not come to an end for an indefinite time. For example, if a drop of cooling oil for the machining point used in a cutting or grinding machining falls on the base, the temperature of that portion is varied to cause the base to start a variation. However, so long as the cooling oil continues to drop (so long as the machining continues), the temperature of that portion continues to vary, and because it takes a very long time for the temperature to diffuse to the whole of the base to establish an equilibrium state, the base temperature continues to vary during that period of time. In the case of a base, because its heat capacity is large, in a case where such a temperature drift is generated, an axis member which is fixed to the base moves to one direction only, a movement like a moment is not generated, and there is almost a parallel movement only; therefore, if the tendency of the movement of an axis member is grasped, the correction for it is not impossible. However, because such a drift which continues to be generated for several tens of hours becomes a large displacement, the residual difference that has not be corrected also becomes large. In this case too, it is understood that it is very effective not to take a countermeasure against the thermal expansion or contraction generated but to reduce the thermal expansion or contraction itself. Accordingly, as regards the material for making up the base also, by using not cast iron or granite as heretofore, but a material having a coefficient of linear expansion of an order of half that of those, the temperature drift of the machining point can be reduced by half. In this case, a temperature drift of one direction which does not influence so much in the height direction but is large in the direction parallel to the base can be reduced, and a high-accuracy free curved optical surface can be generated.

A seventeeth embodiment of the invention is a variant of one of the first to sixteenth embodiments, wherein at least one of the aforesaid first workbench, the aforesaid second workbench, the aforesaid static-pressure slide, and the bases for fixing them is formed of a material having a Young's modulus of 200 GPa or greater.

The material of conventional workbenches and static-pressure slides have been centered on cast iron, and their Young's modulus has been of an order of 150 GPa. This means that when a load of 1000 N per cross-section of 1 cm$^2$ is applied to any one of them, a member having a length of 10 cm varies its length so much as 10 µm. Accordingly, in a portion incapable of taking a large volume or a cross-section structurally, the stiffness becomes low, and its position is easily displaced by the back force component and the cutting force generated in machining. That is, in a multi-axis machining apparatus, there is a problem that if it is made up of a material based on conventional cast iron, the lowering of stiffness necessarily occurs caused by the elastic deformation of not only the mechanism portions but also the material itself.

In contrast with it, as this structure, if the Young's modulus of the material of at least one of the above-mentioned first workbench, the above-mentioned second workbench, the above-mentioned static-pressure slide, and the bases for fixing them is made to be 200 GPa or greater, which is equivalent to two times or greater of the Young's modulus of a conventional material; therefore, it is possible to reduce by half the displacement of the above-mentioned member of the length 10 cm.

A twenty-first embodiment of the invention is a variant of one of the fifth to ninth and fourteenth to twentieth embodiments, wherein the pressure transmission medium of the aforesaid static-pressure slide is a liquid, and its viscosity is 10 poise or less.

Generally speaking, in order to make high the accuracy of the operation of an axis member, it is necessary to weaken the frictional force of the slide; therefore, in a high-accuracy machining apparatus, usually a static-pressure slide is used. However, if the speed of the movement of the workbench is made high, there has been a problem that the pressure transmission medium jetted into the clearance of the static-pressure slide generates heat by the shearing force caused by its viscosity resistance, and the workbench is warmed from the static-pressure surface to be thermally expanded; owing to this, the position of a tool or the position of a work piece is displaced, which prevents a high-accuracy machining.

One of the most effective methods of preventing this is to lower the viscosity of the pressure transmission medium to be used in the static-pressure slide. By the practice of this, not only the viscosity resistance of the pressure transmission medium flowing in the static-pressure clearance is reduced and heat generation is suppressed, but also the pressure loss is reduced; therefore, the supply pressure acts on the static-pressure surface without being lowered, and the stiffness can be made larger. That is, to lower the viscosity of the pressure transmission medium has an effect for two important factors required for a high-accuracy machining, which are the suppression of heat generation and the strengthening of the stiffness. Further, if the speed of the axis member is made higher than the speed of the flow of the pressure transmission medium in the clearance of the static-pressure slide, it has been generated a phenomenon that the pressure transmission medium cannot comply with it, and does not prevail over the whole static-pressure surface. This phenomenon lowers the stiffness of the static-pressure slide sharply, and generates a vibration owing to the unstable supporting; therefore, it has been a cause for axis members to be prevented from a high-speed driving. In order to prevent this, it is considered to lower the viscosity of the pressure transmission medium, and by the practice of this, the shearing frictional force of the pressure transmission medium is weakened, which makes it possible to make the pressure transmission medium prevail over the whole surface of the static-pressure clearance surface even in a high-speed driving. As the result, a high-speed driving of an axis member becomes possible.

As regards the pressure transmission medium, a liquid can make the stiffness higher than a gas for the same supply pressure, and on top of it, a liquid has a better damping characteristic; therefore, a liquid is desirable because it hardly generates a vibration even when its pressure is made high, and it is insensitive even to a suddenly changing external force. Accordingly, so long as the pressure transmission medium is a liquid, on the basis of the sealing and the supply pressure of a pump for supplying it, it is desirable that its viscosity is 10 poise or less, while its lower limit is of an order of 1 poise, which is close to the viscosity of water.

Actually, for a workbench which gave a stiffness of 1000 N/µm at a supply pressure of 20 atm. pressure when the clearance of the static-pressure slide was made to be 10 µm and an oil having a viscosity of 30 poise was employed for the pressure transmission medium, in the case where an oil having a viscosity of 2 poise was employed through the change of the orifice diameter of the static-pressure pad, a stiffness of 1200 N/µm was obtained at a supply pressure of 5 atm. pressure. On top of it, the temperature of the workbench rose by almost 1° C. owing to the oil supply in the former case, but in the latter case, the temperature rose by only 0.1° C., exhibiting only a very small change.

A twenty-second embodiment of the invention is a variant of one of the first to twenty-first embodiments, further comprising an active control means for suppressing the transmission of a vibration from the floor on which said machining apparatus is installed to said machining apparatus. In the above statement, the term "an active control means" signifies a mean such that it comprises a measuring element for detecting a displacement, velocity, acceleration, etc. of the floor as the source of vibration, comprises a mechanism for minutely driving the mount, and practices the removal of the vibration, that is, the suppression or interception of the transmission of the vibration to the machining apparatus, by making the mount vibrate in such a manner as to cancel the vibration on the basis of the output of the measuring element.

Among machining apparatus on the market having a degree of freedom of two or three axes, some of them actualizes a high-accuracy machining by removing minute vibrations from the floor with its main body carried on a air spring called an air mount. However, this air mount is comparatively effective against vibrations with a frequency of 10 Hz or higher, to be able to carry out the removal of vibrations; however, because it always has a resonance point at several Hz, vibrations of a low frequency are transmitted from the floor to the main body of the machining apparatus. In some case, a vibration of the floor is amplified and transmitted to the main body of the machining apparatus. Accordingly, an effective removal of floor vibrations is indispensable to a high-accuracy machining; in particular, as regards a machining apparatus having a degree of freedom of three axes or greater, because its axis members are piled up in two or three stages to make its center of gravity high and are fixed to their bases at their bottom surfaces, it has a structure such that it is easier to generate a moment-like oscillation than a conventional machining apparatus having a degree of freedom of two axes or less. That is, a machining apparatus having a degree of freedom of three axes or greater has a tendency to have a resonance frequency for a minute vibration which is low for the reason of its structure. Accordingly, it is very disadvantageous that a conventional air mount has a resonance point at a low frequency, and there has been a great difficulty in the practice of a high-accuracy machining with a high-accuracy machining apparatus having a degree of freedom of three axes or greater supported by such a passive air mount. However, heretofore, because no consideration has been taken from such a viewpoint, it has never been used, an active air mount which practices removal of vibrations actively even against a low-frequency vibration.

It is desirable in a machining apparatus of a degree of freedom of three axes or greater that, by means of an active air mount having no resonance point even at a low frequency, the vibrations of the floor are removed with a good efficiency, which makes the machining apparatus exhibit a stable accuracy of machining. Especially, the method of control of an active air mount is important. As regards a conventional machining apparatus having a degree of freedom of two axes or less, because each of the axis members is individually fixed to the base to be located in a horizontal plane, if an active control is practiced for a rotary vibration around any one of the two axes in the horizontal direction or a vertical axis, the control is very satisfactory for the result of machining, and reversely, there is almost no effect of the active control for a parallel vibration in the vertical direction; in contrast with this, as regards a machining apparatus having a degree of freedom of three axes or greater, because it has a slide to be driven in the vertical direction, an active control is effective for a parallel vibration in this direction also, and the practice of an active control is effective for all the six axes of the degree of freedom including the two rotation axes parallel to a horizontal axis. In this way, it can be said that it is important that a control for the removal of vibrations is practiced with the driving direction of the axis members and their characteristics taken into consideration sufficiently, and the parameters of vibration suppression are individually optimized.

A twenty-third embodiment of the invention is a machining apparatus of a degree of freedom of three axes or greater comprising a first workbench made of a material having a specific weight of 4 g/cm$^3$ moved along a static-pressure slide by a driving means with a frequency of 50 Hz (desirably 100 Hz) or higher where its servo-gain becomes −3 dB, and a measuring means with a resolution of 10 nm or less for measuring the position of said first workbench.

A twenty-fourth embodiment of the invention is a variant of the twenty-third embodiment, further comprising a second workbench made of a material having a specific weight of 4 g/cm$^3$ or less swiveling along a static-pressure slide, and a measuring means having a resolution of 1 angular second or less for measuring the angle of said second workbench.

A twenty-fifth embodiment of the invention is a variant of the twenty-third or the twenty-fourth embodiment, wherein the machining speed is 600 mm/min or higher.

A twenty-sixth embodiment is a variant of one of the twenty-third to twenty-fifth embodiments, wherein at least one of the aforesaid first workbench, the aforesaid second workbench, the aforesaid static-pressure slide, and the bases for fixing them is formed of a material having a coefficient of linear expansion of $5 \times 10^{-6}$ K$^{-1}$ or less.

A twenty-seventh embodiment is a variant of one of the twenty-third to twenty-sixth embodiments, wherein at least one of the aforesaid first workbench, aforesaid second workbench, the aforesaid static-pressure slide, and the bases for fixing them is formed of a material having a Young's modulus of 200 GPa or greater.

A twenty-eighth embodiment is a variant of one of the twenty-third to twenty-seventh embodiments, wherein the pressure transmission medium of the aforesaid static-pressure slide is a liquid, and its viscosity is 10 poise or lower A twenty-ninth embodiment is a variant of one of the twenty-third to twenty-eighth embodiments, further comprising an active suppressing means for suppressing the transmission of a vibration from the floor on which said machining apparatus is installed to said machining apparatus.

A thirtieth embodiment is a variant of one of the twenty-third to twenty-ninth embodiments, wherein at least one of the aforesaid first workbench, aforesaid second workbench, the aforesaid static-pressure slide, and the bases for fixing them is formed of a material containing a silicon nitride component of 50% by weight or more.

By this invention, it is possible to provide a machining apparatus of a degree of freedom of three axes or greater to make possible the compatibility of its high accuracy of machining with its high efficiency of machining.

In the following, the embodiment of this invention will be explained in detail with reference to the drawings. FIG. 1 is a perspective view of a 5-axis machining apparatus 10 of this embodiment. In FIG. 1, an active air mount 11 supported on a floor F by four legs 11a (only three legs are shown) is a suppression means for suppressing the transmission of vibrations and has a function not to transmit a vibration of the floor to the base 12.

On a rail 12a of the base 12 supported on the active air mount 11, there is provided a slide table 13 movably in the Z-axis direction, and on the slide table 13, there is provided a swivel table 14 rotatably. In addition, the slide table 13 and the swivel table 14 are supported in a low-friction manner by their respective static-pressure slides (not shown in the drawing) with a liquid introduced as a medium with respect to the rail 12a and the slide table 13 respectively.

Further, on the base 12, at a rail 15a laid over a pair of support blocks 15, there is provided a slide table 16 movably in the X-axis direction, at the rail 16a on the slide table 16, there is provided a slide table 17 movably in the Y-axis direction, and on the slide table 17, there is provided a swivel table 18 rotatably. In addition, the slide table 16, the slide table 17, the swivel table 18 are supported in a low-friction manner by their respective static-pressure slides (not shown in the drawing) with an oil introduced as a medium with respect to the rail 15a, the rail 16a, and the slide table 17 respectively.

In this embodiment, for the slide tables 13, 16, and 17, which are regarded as the first workbench, laser scales having a measuring resolution of 1 nm are provided, which makes it possible to measure their travels, and it is actualized to carry out a driving by a linear-motor as the driving means with a frequency of 50 Hz (desirably 100 Hz) or higher where the servo-gain becomes −3 dB. On the other hand, on the swivel tables 14 and 18, there are installed rotary encoders having an angular resolution of 0.1 angular second, which makes it possible to measure the rotational angle. In the static-pressure slide of this embodiment, the viscosity of the oil was made 2 poise, and the supply pressure was made 5 atm. pressure. In this case, the stiffness of the slide shaft in the horizontal/vertical direction was 1350 N/μm, which was a sufficient value.

The slide tables 13, 16, and 17, the swivel tables 14 and 18, and the static-pressure slides were all made of silicon nitride, and as regards the swivel axis, its rotor portion was made of silicon nitride, and its stator portion was made of a special alloy having a coefficient of linear expansion of $4 \times 10^{-6}$. Further, for the support blocks 15, invar was used. For the base 12, a special alloy having a coefficient of linear expansion of $\times 10^{-6}$ $K^{-1}$ is used by welding. The Young's modulus of this special alloy was 130 GPa, and by the thickness of the plate being made to be 40 mm, a stiffness necessary for a base was secured.

A work piece for generating a free curved optical surface was fitted to the swivel table 14, a diamond tool (not shown in the drawing) was set to the swivel table 18, and by a simultaneous operation of the slide tables 13, 16, and 17 and the swivel table 14 (4-axis machining), a cutting machining for shaping was carried out. The feed rate of the slide table 13 was 600 mm/min or higher, and the machining time was 36 hours. The surface roughness of the cut surface was 5 nm by Rmax, and the accuracy of shape was 57 nm; thus, a high accuracy about 3 times the accuracy of machining of a multi-axis machining apparatus on the market was achieved.

Figure 2:
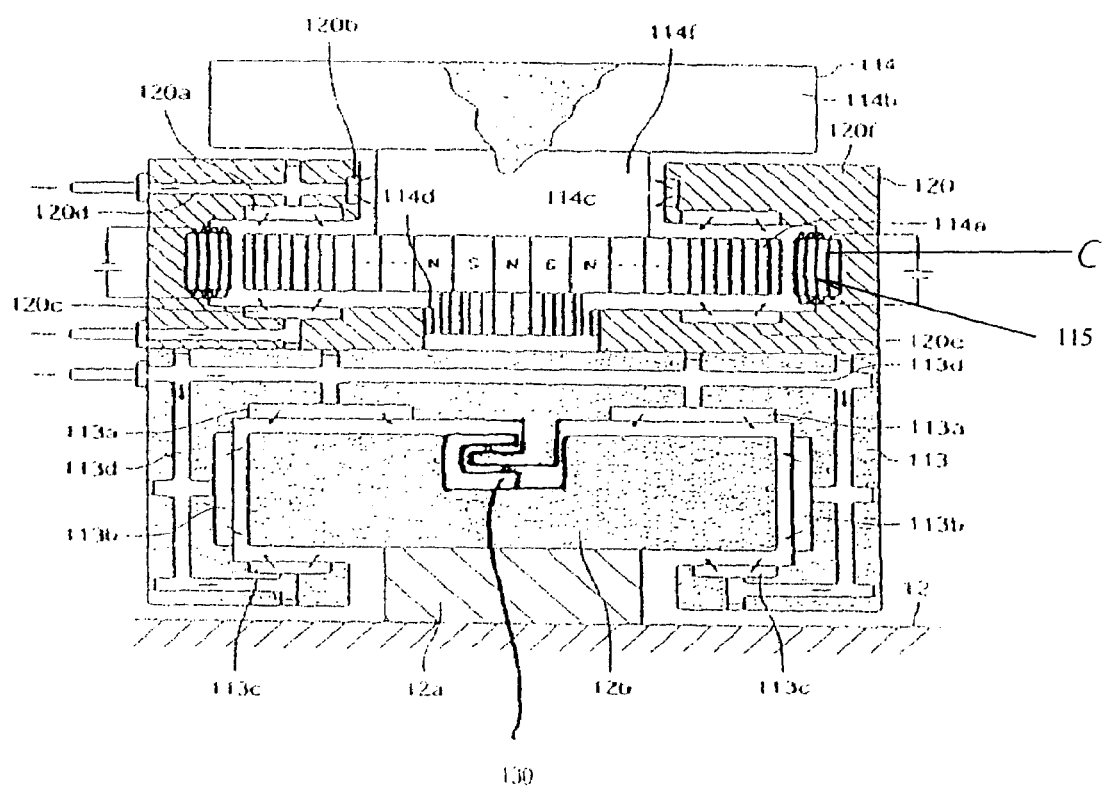
FIG. 2 is a cross-sectional view of a slide table and a swivel table in a modified example of this embodiment.

FIG. 2 is a cross-sectional view of a slide table and a swivel table in a modified example of this embodiment (equivalent to a cross-sectional view at the II-II line of FIG. 1). In FIG. 2, on a rail support member 12a of a base 12, a flat-plate-shaped rail 12b which is formed of a ceramic material and extending to the direction perpendicular to the paper surface is fixed. In such a way as to cover the rail 12b, a slide table 113 formed of a ceramic material having a U-shaped cross-section is arranged.

The slide table 113 forms static-pressure pads 113a and 113a (a thin space or a porous material each) at the downward facing portion of its inner peripheral surface opposite to the upper surface of the rail 12b, forms static-pressure pads 113b and 113b at the portion of its inner peripheral surface opposite to the side surface of the rail 12b, and forms static-pressure pads 113c and 113c at the upward facing portion of its inner peripheral surface opposite to the lower surface of the rail 12b. To each of the static-pressure pads 113a to 113c, oil of a specified pressure is supplied through holes 113d which are present as extending in the slide table 113. In addition, to the slide table 113, an encoder (not shown in the drawing) is fixed, and on the other hand, opposite to this, a sensor (not shown in the drawing) is provided on the base 12; thus, it is actualized to make it possible to measure the travel of the slide table 113 with respect to the base 12 with a resolution of 10 nm or less. The encoder and the sensor makes up a measuring means.

On the upper surface of the slide table 113, a support table 120 is fixed. It is desirable that the support table is made of an alloy such as invar for the purpose of burying a coil etc. therein as will be described later, but it is also possible to use a ceramic material if it is workable.

The support table 120 having approximately a shape of a hollow cylinder contains inside a swivel table unit 114. To be more concrete, the swivel table unit 114 has a shape such that the lower gear-shaped portion 114a formed of a magnetic material and an upper disk portion 114b formed of a ceramic material are coupled through a disk-shaped reduced-diameter portion 114f. The gear-shaped portion 114a has a plurality of teeth formed on its outer circumference, and has N poles and S poles alternately arranged by the magnetizing of the teeth one by one. Opposite to these teeth, on the inner peripheral surface of the support table 120, there are arranged coils C of a number larger by one than the number of the teeth of the gear-shape portion 114a. The gear-shaped portion 114a and the coils C makes up an AC servomotor 115.

On the lower surface of the gear-shaped portion 114a, an encoder 114c is fixed; on the other hand, opposite to this, a sensor 114d is provided on the support table 120, which makes it possible to measure the rotational angle of the swivel table unit 114 with respect to the support table 120 with a resolution of 1 angular second or less. The encoder 114c and the sensor 114d makes up a measuring means.

The support table 120 forms a ring-shaped static-pressure pad 120a on the lower surface of its upper flange 120f opposite to the upper surface of gear-shaped portion 114a, forms a ring-shaped static-pressure pad 120b on the inner peripheral surface of its upper flange 120f opposite to the outer peripheral surface of the reduced-diameter portion 114f of the swivel table unit, and forms a ring-shaped static-pressure pad 120c on the upper surface of its lower flange 120e opposite to the lower surface of the gear-shaped portion 114a. To each of the static-pressure pads 120a to 120c, oil of a specified pressure is supplied through a hole 120d which is provided as extending in the support table 120.

The operation of this embodiment will be explained. By the supply of oil from an external oil pressure source to the hole 113d, oil is jetted from the static-pressure pads 113a to 113c, and by the use of the static pressure, the slide table 113 carrying the support table 120 is supported against the rail 12b in a state of non-contact with it. In this state, by the driving of a linear motor 130, the slide table 113 is to be moved to a desired position with respect to the base 12.

Further, by the supply of oil from an external oil pressure source to the hole 120d, oil is jetted from the static-pressure pads 120a to 120c, and by the use of the static pressure, the swivel table unit 114 supporting a work piece (not shown in the drawing) is supported against the support table 120 in a state of non-contact with it. In this state, by the application of an alternating current to the coils C, the gear-shaped portion 114a is magnetically driven, and the swivel table unit 114 is to be rotated by a desired angle with respect to the support table 120.

By this embodiment, because the slide table 113 as the first workbench is formed of a ceramic material, even in a case where a temperature variation is produced, thermal expansion can be controlled to be smaller as compared to steel; therefore, the accuracy of machining can be maintained while the acceleration/deceleration performance is made higher due to the slide table being capable of weight reduction, which makes it possible to shorten the machining time. In particular, because the rail 12b is formed of a ceramic material having the same coefficient of linear expansion as that of the slide table 113, in a case where a temperature change is produced, equal thermal expansions are produced; therefore, it is possible to suppress the change of the static-pressure clearance at the minimum, to carry out a high-accuracy machining. Further, because it is enough even if the capacity of the linear motor or the like as the driving means for driving the slide table 113 is small, energy saving can be achieved while the quantity of heat generation can also be suppressed; therefore, a higher-accuracy machining can be actualized.

Figure 3:
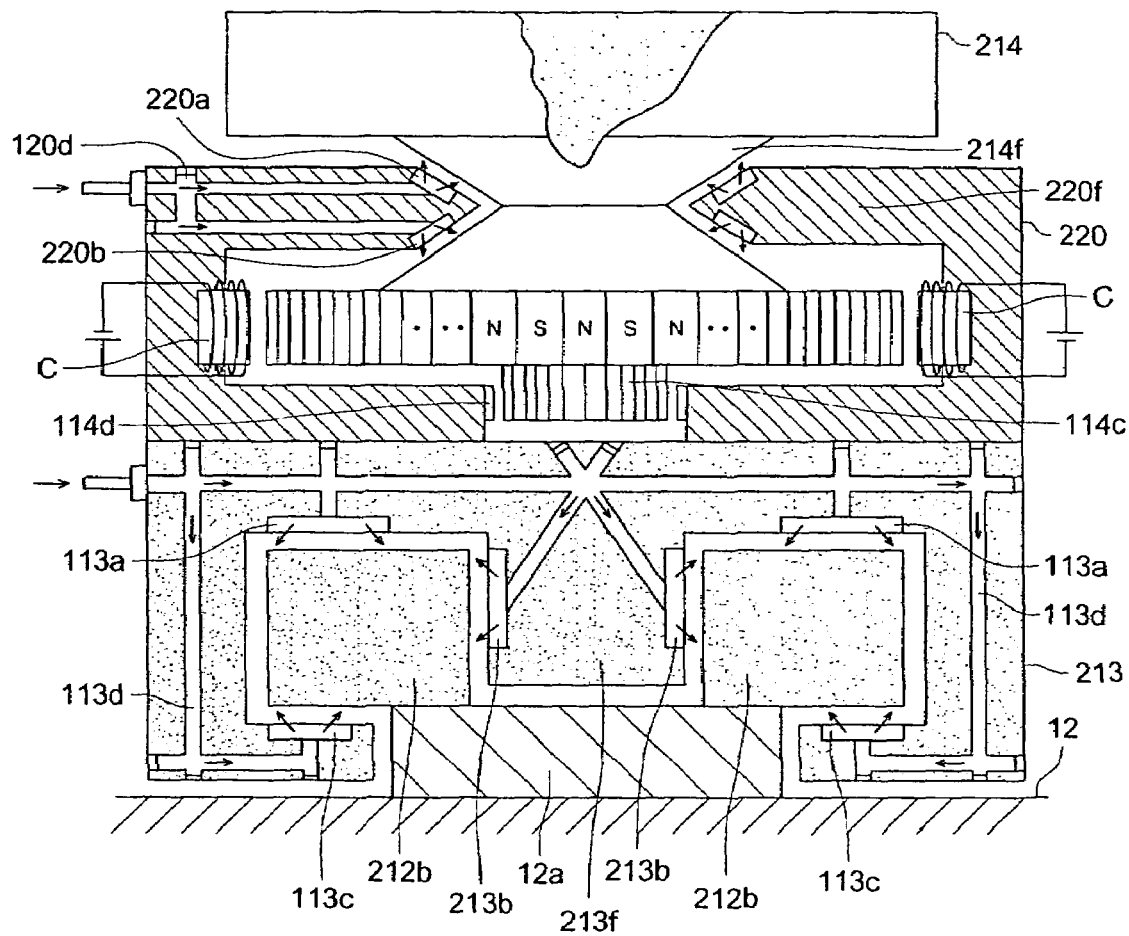
FIG. 3 is a cross-sectional view of a slide table and a swivel table in another modified example of this embodiment.

FIG. 3 is a cross-sectional view similar to FIG. 2 showing another modified example of this embodiment. Rails made of a ceramic material 12b and 12b placed on a base 12 are separately positioned at the left and right in the drawing, a slide table 213 made of a ceramic material as the first workbench forms a projection portion 213f extending in the lengthwise direction between the rails 212b and 212b, of which on the side surface static-pressure pads 213b and 213b are provided. By doing this way, the bending of the slide table 213 can be removed, and the stiffness for support can be made higher.

Further, as regards a swivel table unit 214 made of a ceramic material as the second workbench, its reduced-diameter portion 214f has a double-tapered shape with its diameter more reduced gradually towards its center in the vertical direction. Further, as regards an upper flange 220f provided as extending from the support table 220, its inner periphery in the radial direction has a tapered shape corresponding to the reduced-diameter portion 214f of the swivel table unit 214, and on the upper and lower tilt surfaces of the inner periphery, there are provided ring-shaped static-pressure pads 220a and 220b. As regards the structure of other portions, explanation will be omitted because they are the same as those in the modified example shown in FIG. 2.

Figure 4:
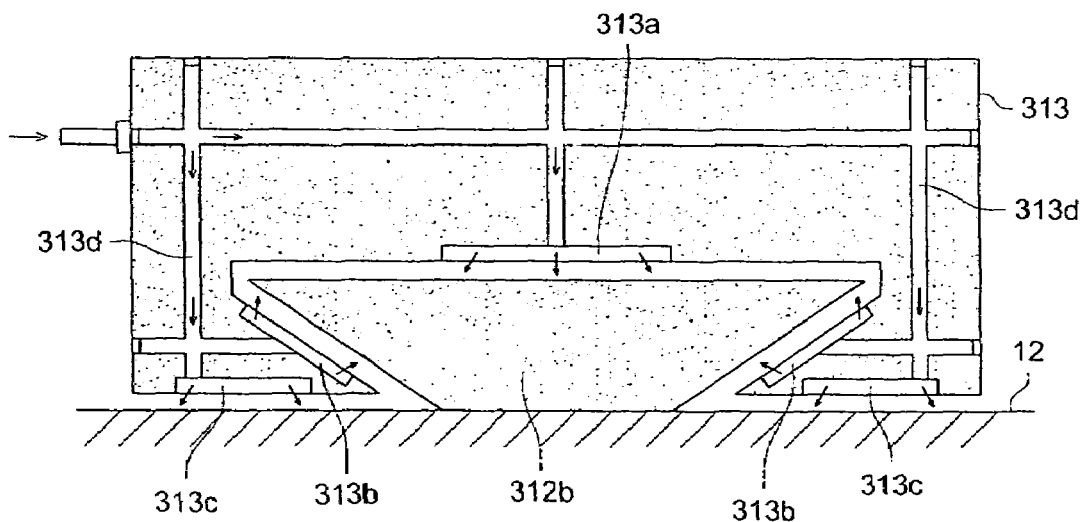
FIG. 4 is a cross-sectional view of a slide table in further another modified example of this embodiment.

FIG. 4 is a cross-sectional view similar to FIG. 2 showing further another modified example of this embodiment, but its support base and swivel table unit are omitted. In FIG. 4, a rail 312b made of a ceramic material placed on the base 12 has a cross-section of a shape of a reverse trapezoid, and a slide table 313 also made of a ceramic material has an inner peripheral surface of a shape corresponding to the above-mentioned cross-section.

The slide table 313 as the first workbench forms a static-pressure pad 313a on the inner peripheral surface opposite to the upper surface of the rail 312b, forms static-pressure pads 313b and 313b on the inner peripheral tilt surface opposite to the side tilt surface of the rail 312b, and forms static-pressure pads 313c and 313c on its bottom surface opposite to the top surface of a base 12. It is to be done that to each of the static-pressure pads 313a to 313c, oil of a specified pressure is supplied from the outside through holes 313c provided as extending in the slide table 313. As regards the structure of other portions, explanation will be omitted because they are the same as those in the modified example shown in FIG. 2.

Up to now, this invention has been explained with reference to the embodiment; however, it is a matter of course that this invention should not be construed with a limitation to the above-mentioned embodiment, and can be suitably modified or altered. For example, even if at least one workbench that is driven at the highest speed of all is formed of a ceramic material, the effect of this invention can be exhibited.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A machining apparatus for conducting at least one of a cutting process and a grinding process, comprising:
    a stationary base; and
    a working device mounted on the stationary base and having a degree of freedom of more than two axes to conduct at least one of a cutting process and a grinding process, the working device comprising a first working bench which is movable lineally, and a second working bench which is supported by the first working bench and is rotatable with a degree of freedom of not less than one axis while holding a work piece or a tool,
    wherein each of the first and second working benches is formed of a ceramic material and is guided by use of a static-pressure.

2. The machining apparatus of claim 1, wherein the ceramic material has a coefficient of linear expansion of not more than $5 \times 10^{-6}$ $K^{-1}$.

3. The machining apparatus of claim 1, wherein the ceramic material contains silicon nitride of not less than 50% by weight and has a specific weight of not more than 4 $g/cm^3$.

4. The machining apparatus of claim 1, wherein the ceramic material has a Young's modulus of not less than 200 GPa.

5. The machining apparatus of claim 1, wherein the second working bench is driven by an AC servomotor.

6. The machining apparatus of claim 1, wherein the working device further comprises a support table for supporting the first working bench and the support table is formed of at least one of a ceramic material satisfying at least one of conditions of having a coefficient of linear expansion of not more than $5 \times 10^{-6}$ $K^{-1}$, containing silicon nitride of not less than 50% by weight and having a specific weight of not more than 4 $g/cm^3$, and having a Young's modulus of not less than 200 GPa, and an alloy containing nickel from 10% by weight to 50% by weight.

7. The machining apparatus of claim 1, wherein the stationary base is formed of a ceramic material satisfying at least one of the conditions of having a coefficient of linear expansion of not more than $5 \times 10^{-6}$ $K^{-1}$, containing silicon nitride of not less than 50% by weight and having a specific weight of not more than 4 $g/cm^3$, and having a Young's modulus of not less than 200 GPa.

* * * * *